March 1, 1966 G. A. ALPHONSE 3,238,512

DUAL ELEMENT SUPERCONDUCTIVE MEMORY

Filed Jan. 18, 1962 2 Sheets-Sheet 1

INVENTOR.
GERARD A. ALPHONSE
BY
Attorney

March 1, 1966 G. A. ALPHONSE 3,238,512

DUAL ELEMENT SUPERCONDUCTIVE MEMORY

Filed Jan. 18, 1962 2 Sheets-Sheet 2

INVENTOR.
GERARD A. ALPHONSE
BY
Samuel Cohen
Attorney 3,238,512

DUAL ELEMENT SUPERCONDUCTIVE MEMORY

Gerard A. Alphonse, New York, N.Y., assignor to Radio Corporation of America, a corporation of Delaware Filed Jan. 18, 1962, Ser. No. 167,013
8 Claims. (Cl. 340—173.1)

The present invention relates to memories. More particularly, the invention relates to an improved arrangement for sensing the output of a memory such as a superconductor memory.

A superconductor memory such as described in the IRE Transactions on Electronic Computers, vol. EC–10, No. 3, September 1961, pages 438–446, includes a thin film superconductor plane for storing persistent circulating currents. The drive lines for the memory are located on one side of the plane. They consist of a group of X drive wires which extend in one direction and a group of Y drive wires which extend in another direction. The intersections between X and Y drive wires are memory locations. In general, the memory is operated so that each intersection stores one binary bit.

The sense line from the memory is placed on the other side of the memory plane from the drive lines. It consists of a winding which is laid down in a zig-zag pattern that is carefully aligned with the intersections of the X and Y drive lines. The disadvantage of this sensing technique is the severe registration problem it creates. The alignment between the sense line and the XY drive line cross-over points must be precise and, in view of the close spacing of the cross-over points, the problem of obtaining such alignment may be formidable. In the memory shown in the article above, the spacing between XY cross-over is about 50 mils in each direction. Even here, the registration problem is severe. In an enlarged memory presently proposed, there are 128 X drive lines and 128 Y drive lines, providing a total of 16,384 storage locations. The total area on which these cross-overs are located is 1.28 inches—a spacing of less than 10 mils between cross-overs. In a memory of this size, the problem of precisely registering a zig-zag sense winding with each XY line intersection appears to be difficult, if not insurmountable, at the present state of the art.

One object of the present invention is to provide a simplified arrangement for sensing the output of a memory such as a superconductor memory.

Another object of the invention is to provide a sensing arrangement which does not require precise registration between a sense winding and storage locations in the memory.

Another object of the present invention is to provide a sensing arrangement which provides a relatively high output voltage and which has a relatively good signal-to-noise ratio, that is, relatively good "1:0" ratio. 1:0 ratio, as used here, relates to the relative voltage outputs obtained from the memory when reading binary "one" and binary "zero" from the memory, respectively.

Another object of the invention is to provide new cryotron arrangements which are especially useful for selecting memory locations.

In the memory of the present invention, rather than employing a zig-zag winding for the sense line, X and Y lines are employed which are identical to the X and Y drive lines. This permits the same masks to be employed to lay down the X and Y sense lines as are used to lay down the X and Y drive lines. The use of the same masks makes the problem of registration of the sense wire intersections with the XY drive wire intersections relatively easy. Further, the same selection trees may be employed for writing information into the memory and reading out information from the memory thereby simplifying the memory construction.

The invention is described in greater detail below and is illustrated in the following drawings of which:

In the discussion which follows, similar reference numerals are applied to similar elements. Also, although not shown, it is to be understood that the memory discussed is maintained at a low temperature, such as several degrees Kelvin, at which superconductivity is possible.

Figures 1, 2:
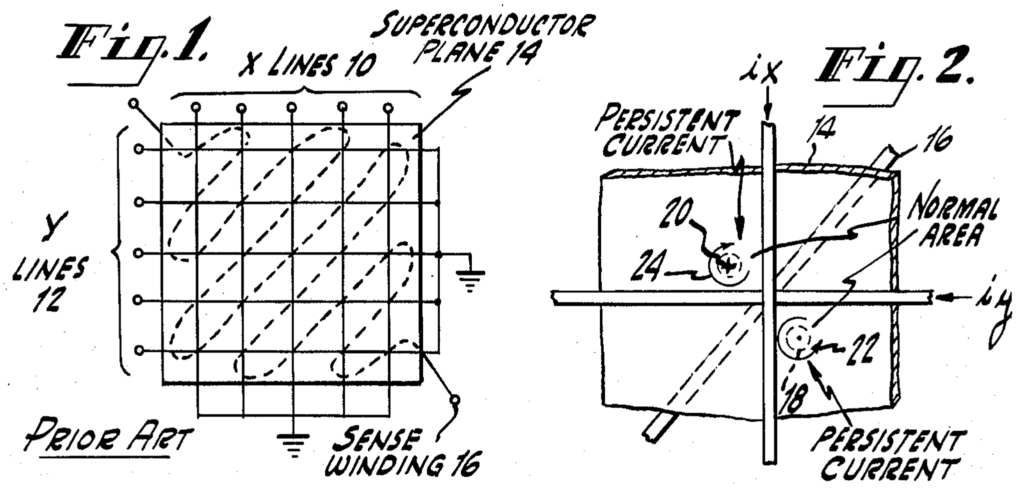
FIG. 1 is a diagrammatic showing of a prior art superconductor memory.
FIG. 2 is a sketch to help explain the operation of the circuit of FIG. 1.

The known memory shown in FIG. 1 includes X drive lines 10 and Y drive lines 12. A superconducting plane 14 located beneath the X and Y lines serves as the storage medium. A zig-zag sense winding 16 is located beneath the superconducting plane 14. As can be seen in the figure, the sense winding is in registration with the X and Y cross-overs.

In practice, there are many more X and Y lines than are shown. Further, there is insulation between the various lines and planes. A more complete description of a memory may be found in the article cited above and in application Serial No. 76,648, filed December 19, 1960, now abandoned, by L. L. Burns, Jr., and assigned to the same assignee as the present invention.

In the operation of a memory such as shown in FIG. 1, coincident currents applied to selected X and Y lines are of sufficient amplitude, taken together, to produce a magnetic field which exceeds the critical field of the superconductor in the areas indicated by a dot and cross in FIG. 2. (The dot represents a magnetic field coming out of the plane of the paper and the cross represents a magnetic field going into the plane of the paper.) These areas, namely, 18 and 20 switch from their superconducting to their normal state. The magnetic field due to the currents $i_x$ and $i_y$ now penetrates this superconductor (in its superconducting state the superconducting plane 14—actually a superconducting film, acts as a shield to a magnetic field) and induces persistent circulating currents in the plane. These currents surround the normal areas 18 and 20.

When the X and Y drive currents are reduced to "zero," the magnetic fields surrounding the windings collapse, however, persistent currents remain in the superconductor and circulate in the directions shown at 22 and 24. Persistent currents in these directions can be arbitrarily assumed to represent storage of a binary digit of one value such as "one." Circulating persistent currents in the opposite directions then represent storage of the binary digit "zero."

In order to read out the bit stored at a particular location in the memory, current is applied in a standard direction to the X and Y lines which intersect that location. For example, the current may be applied in a direction to cause a circulating current to be induced in a direction representing storage of the binary digit "zero." In this case, if the memory location interrogated is storing a "one," the interrogation current will cause that area to go normal and a magnetic field will penetrate through the superconductor plane. This magnetic field links the sense winding 16 and induces a current in the sense winding. If the memory location interrogated is storing a "zero," the magnetic field induced by the interrogating currents tends to induce a circulating current in a sense to subtract from the persistent circulating current. In this case, the storage location (such as the area "bridge" between 18 and 20) does not go normal, the magnetic field does not penetrate the film, and no current is induced in the sense winding.

As already indicated, the sensing scheme just described is suitable for memories of relatively small size, that is, for a memory in which the storage locations are relatively widely spaced. In such cases, the X and Y lines are relatively large, the sense line can be made relatively large, and registration between the three lines, although in no sense a simple problem, can be accomplished with the high precision masking techniques presently available. However, as the memory capacity increases and the spacing between cross-over points and drive line widths correspondingly decrease, the registration problem becomes formidable.

Figure 3:
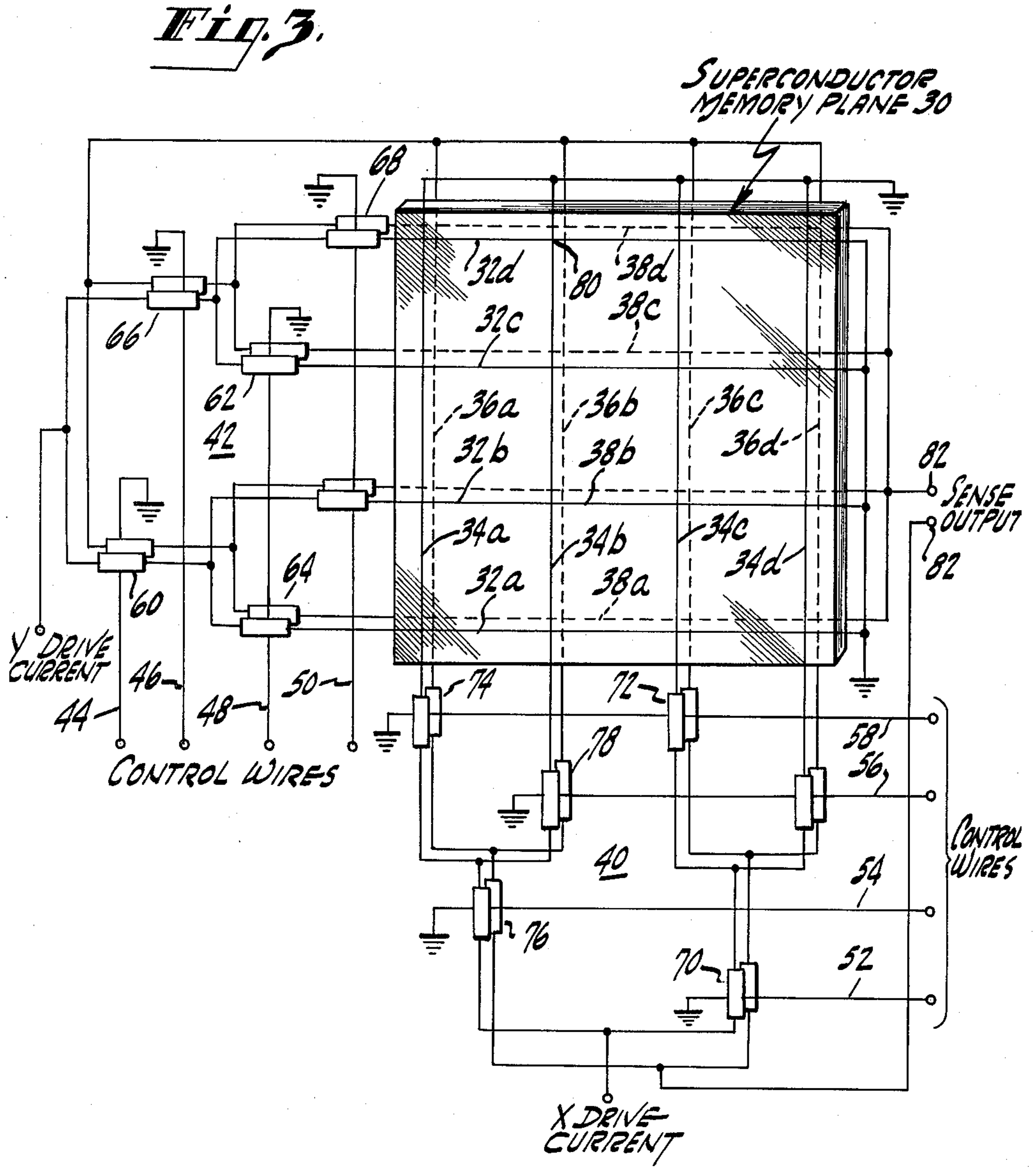
FIG. 3 is a diagrammatic showing of a memory according to the present invention.

The solution to the problem provided by the invention is shown schematically in FIG. 3. The memory plane, corresponding to superconductor plane 14 of FIG. 1, appears at 30. The X drive lines 34_a_–34_d_ and the Y drive lines 32_a_–32_d_ are similar to the drive lines of the prior art memory of FIG. 1. However, a zig-zag sense line is not employed. Instead, there are a set of X sense lines 36_a_–36_d_ and a set of Y sense lines 38_a_–38_d_. These are deposited through the same masks as are used to lay down the X and Y drive lines. The vacuum deposition techniques are conventional and are discussed in the article above. Since the mechanism for positioning the masks is a highly precise machine tool and since the same masks are employed for the drive and sense lines, the crossovers of the X and Y drive lines register precisely with the cross-overs of the X and Y sense lines.

A particular memory location is selected by means of the cryotron trees 40 and 42. Each tree includes eight cryotrons. Each cryotron consists of two gate electrodes and one control electrode. The control wires lead to selection means such as a register. For example, the wires 44 and 46 may be connected to the 1 and 0 output terminals, respectively, of one flip-flop in a register and the wires 48 and 50 may be connected to the 1 and 0 terminals, respectively, of a second flip-flop in the same register. Similarly, the wires 52 and 54 may be connected to a flip-flop in another register and the wires 56 and 58 to a second flip-flop in the other register.

In the operation of the memory of FIG. 3, a storage location for writing information into the memory is selected by actuating certain ones of the control wires and applying X and Y drive currents. For example, if a current is applied to control wires 44 and 48, this disables cryotrons 60, 62 and 64. The Y drive current then flows only through cryotrons 66 and 68 to Y drive line 32_d_. If at the same time a current is applied to lines 52 and 58, this disables cryotrons 70, 72 and 74. The X drive current therefore flows only through cryotrons 76 and 78 to X drive line 34_b_. The memory location at the intersection 80 of the two drive lines 36_d_ and 32_d_ is therefore driven normal and made to store the binary bit "one."

In order to read out a memory location, a similar procedure to that described above is followed except that the polarity of the drive currents is reversed. For example, if it is desired to read out the memory location at the intersection 80, the same control wires are energized as when information is written into the storage location at intersection 80. The drive currents drive the memory location at intersection 80 normal and induce sense voltages in the sense lines 36_b_ and 38_d_. The sense voltage in sense line 38_d_ induces a flow of current through the lower gates of cryotrons 68, 66, 78 and 76. The current induced in sense line 36_b_ induces a flow of current through the same cryotrons. The two currents are additive and provide a sense signal output at output terminals 82.

Figure 4:
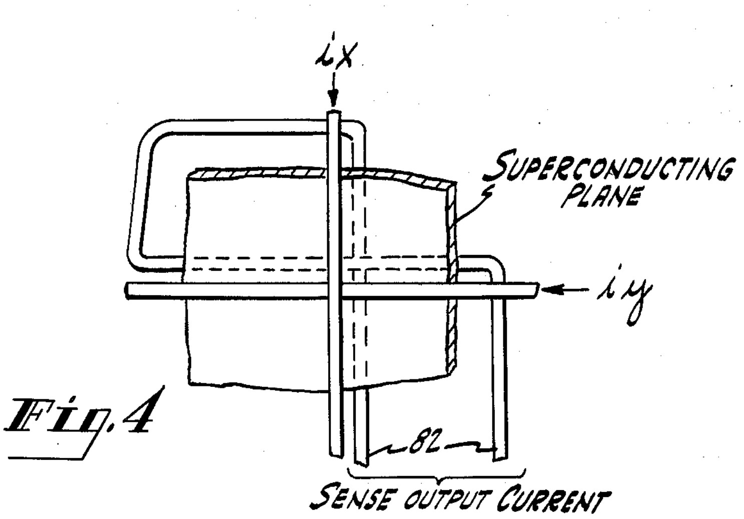
FIG. 4 is a sketch of one memory location of the memory of FIG. 3.

An enlarged view of one storage location appears in FIG. 4. The cryotrons have been omitted to make clear that during the read cycle, the sense output lines form a closed circuit which leads to the output terminals 82.

If the X and Y drive currents are equal and each is capable of inducing a voltage of a value E in a line parallel to the drive line, it can be shown that in the prior art arrangement of FIG. 1 the voltage $E_s$ induced in the sense winding has a value $E\sqrt{2}$. This assumes unity coupling to the sense wire, a reasonable assumption in view of the close spacing between the sense line and the drive lines. The factor $\sqrt{2}$ results from the 45° angle between the drive lines and the sense lines. Under the same conditions, the voltage induced in the XY sense matrix of the present invention is 2E. A voltage E is induced in the X sense line and a voltage E is induced in the Y sense line, and these voltages are additive. Thus, not only does the present invention have the advantage of ease of registration of the sense lines with the memory location but also the advantage of increased signal output with respect to the memory of FIG. 1 by a factor equal to the $\sqrt{2}$.

Figure 5:
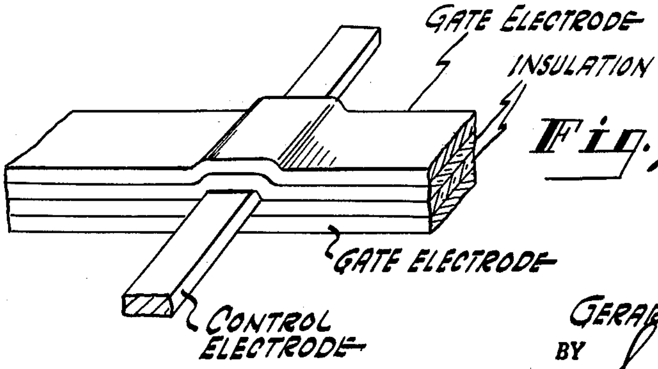
FIG. 5 is a perspective view of the cryotrons employed in the selection trees of FIG. 3.

For the purpose of drawing simplicity, the insulation in the memory system of the present invention is not shown. However, it is to be understood that there are layers of insulation such as silicon monoxide between the X and Y sense lines and the memory, just as there are layers of insulation between the X and Y drive lines and the memory. Similarly, there is a layer of insulation between each gate electrode and the control electrode of the cryotron. The latter is shown in the enlarged view of FIG. 5.

The memory shown in FIG. 3 has only 16 storage locations. In practice, the memory may have many, many more drive lines and storage locations in each memory plane.

What is claimed is:

1. In combination, a thin film cryotron comprising two thin film, substantially parallel, superconductor gate electrodes and a thin film superconductor control electrode sandwiched between and insulated from the two gate electrodes, whereby when a control current is applied to the control electrode, both gate electrodes concurrently may be driven from the superconducting to the normal state; a circuit individual to the first gate electrode including a first signal input circuit connected through that electrode to a first current carrying line; and a circuit individual to the second gate electrode including a second signal input circuit coupled through said second gate electrode to a second current carrying line.

2. In combination, a thin film cryotron comprising two thin film superconductor gate electrodes and a thin film superconductor control electrode sandwiched between and insulated from the two gate electrodes and extending at right angles to the two gate electrodes, whereby when a control current is applied to the control electrode, both gate electrodes concurrently may be driven from the superconducting to the normal state; a circuit individual to the first gate electrode including a first signal input circuit connected through that electrode to a first current carrying line; and a circuit individual to the second gate electrode including a second signal input circuit coupled through said second gate electrode to a second current carrying line.

3. In a superconductor memory, X and Y drive lines; X and Y sense lines; a first cryotron selection tree common to all X lines connected to both the X drive and sense lines; and a second cryotron selection tree common to all Y lines connected to both the Y drive and sense lines.

4. A superconductor memory comprising, in combination, a superconductor memory plane, X drive lines over one surface of the memory plane; Y drive lines over the same surface of the memory plane and crossing the X drive lines, the points of crossing defining memory locations in the memory plane at which persistent currents may be stored in response to coincident drive currents applied to the X and Y drive lines; and X and Y sense lines, aligned with and having the same configuration as the X and Y drive lines, and located over the opposite surface of the memory plane.

5. In a superconductor memory, a set of X drive lines; a corresponding set of X sense lines aligned with the X drive lines; a first cryotron selection tree for the X lines connected to one end of all X lines; a set of Y drive lines; a corresponding set of Y sense lines aligned with the Y drive lines; a second cryotron selection tree for the Y lines connected to one end of all Y lines; a common connection to a point of reference potential at the other end of all drive lines; and a connection from the other end of all sense lines of one group of said selection tree for the other group of sense lines.

6. In a superconductor memory, a superconductor memory plane; X and Y drive lines on one side of the plane; X and Y sense lines aligned with the X and Y drive lines and located on the other side of the memory plane; a first cryotron selection tree common to all X lines connected to both the X drive and sense lines; and a second cryotron selection tree common to all Y lines connected to both the Y drive and sense lines.

7. The combination of a cryotron selection tree in which each cryotron has first and second gate electrodes and a single control electrode; a set of drive lines for a superconductor memory connected to the first gate electrodes; and a set of sense lines for said memory connected to the second gate electrodes.

8. In a superconductor memory, a superconductor memory plane; X and Y drive lines on one side of the plane; X and Y sense lines aligned with the X and Y drive lines and located on the other side of the memory plane; a first selection tree formed of superconductor elements common to all X lines connected to both the X drive and sense lines; and a second selection tree formed of superconductor elements common to all Y lines connected to both the Y drive and sense lines.

References Cited by the Examiner

UNITED STATES PATENTS

| | | | |
|---|---|---|---|
| 2,958,848 | 11/1960 | Garwin | 340—173.1 |
| 2,966,647 | 12/1960 | Lentz | 340—173.1 |
| 3,001,178 | 9/1961 | Buck | 340—173.1 |

FOREIGN PATENTS

| | | |
|---|---|---|
| 624,032 | 7/1961 | Canada. |
| 1,247,274 | 10/1960 | France. |

OTHER REFERENCES

Proceedings of the IRE, "The Cryotron—A Superconductive Computer Component," by D. A. Buck, pages 482–488, April 1956.

IRVING L. SRAGOW, *Primary Examiner.*